United States Patent Office 3,689,288
Patented Sept. 5, 1972

3,689,288
HIGH PROTEIN PUDDING
Jesse Thomas Duren, Belleville, Ill., assignor to Ralston Purina Company, St. Louis, Mo.
No Drawing. Filed June 18, 1970, Ser. No. 47,555
Int. Cl. A23l *1/14*
U.S. Cl. 99—139    15 Claims

ABSTRACT OF THE DISCLOSURE

A high protein pudding is produced which utilizes the protein material as the thickening agent. A mixture containing a protein material is subjected to a heating medium to form a gel, and thereafter the material is cooled while subjected to mechanical working so as to form a pudding having a texture and consistency substantially similar to starch pudding.

BACKGROUND OF THE INVENTION

In the past, puddings have been made which utilize starch as the media for obtaining the desirable thickening and gel-like consistency thereof. These prior art puddings contain a maximum of approximately 1% protein and, therefore, were not particularly beneficial in aiding in the protein content of the diet. The procedure followed in preparing puddings of this particular class consisted of heating the starch containing pudding material to a predetermined level, and thereafter subjecting the mixture to a cooling action wherein the gel formation began, and thereafter placing the slightly gelled mixture into cans for completion of the cooling of the mixture. This final cooling step served to set up the final gel structure to produce the desired consistency of the starch-type pudding. Thus, in order to obtain the desired consistency and texture of these types of pudding products, extreme care had to be utilized in the cooling operation since the texture was finally determined after the material had been placed in cans. If care was not exercised in this operation, is was possible for successive runs of pudding to have wide variances in the consistency and texture thereof.

Previous attempts to produce a high protein pudding have been unsuccessful due to the production of a tough gel structure somewhat rubbery and the adverse affect which the protein had on the flavor and texture of such pudding. Therefore, it was believed necessary to maintain the protein content of starch-type puddings at a low value so that the use of pudding as a protein supplement for the diet was nonexistent.

Contrary to this, applicant has provided a process of preparing a high protein pudding product which may contain up to a maximum of approximately 15% protein. In addition, the process allows for better controls to be exercised in producing a uniform consistency or texture in the pudding product. Particularly, this is achieved due to the fact that the protein containing mixture forms the gel consistency during the cooking operation and subsequently during cooling the gel mixture may be subjected to mechanical working such as to achieve the desired texture and consistency prior to inserting the product into a can.

It is, therefore, the principal object of the present invention to provide a pudding product having a high protein content.

It is a further object of the present invention to provide a process for producing a high protein pudding product which may be simply operated and which provides a great degree of flexibility in controlling the final texture of the pudding product.

It is a further object of the present invention to provide a process for producing a high protein pudding wherein the pudding mixture forms a gel during the heating or cooking thereof, and thereafter this gel formation is subjected to cooling and mechanical action to achieve the desired consistency and texture of the final pudding product.

These and other objects and advantages of the invention will become more apparent in the description hereinafter.

SUMMARY OF THE INVENTION

The present invention comprises a high protein pudding and method of producing same. The process of producing the high protein pudding consists of the steps of: forming an aqueous protein containing mixture, exposing the mixture to a heat source to heat the mixture to a predetermined level whereby a gel is formed, cooling the gelled material while subjecting it to mechanical working and thereafter placing the pudding in a can.

DESCRIPTION OF THE PREFERRED EMBODIMENTS

The present invention is concerned with producing a high protein pudding which may be utilized as a protein supplement for dietary purposes. In preparing puddings of this nature, it had previously been experienced that the protein content adversely affected the flavor and texture and also resulted in a tough gel structure which was somewhat rubbery.

The high protein pudding of the present invention may be produced by forming a mixture of protein containing material such as vegetable protein isolate, concentrate, or curd with other well known pudding ingredients such as sugar, non-fat dry milk, and flavoring materials. This mixture of protein containing materials and flavoring material is then formed into an aqueous mixture by the addition of water. The water added should constitute between 50–78% of the pudding mixture. The protein content should be in the range of between approximately 3–15% by weight of the pudding mixture. It has been found that if the protein content should be below approximately 3% by weight of the mixture that there is not sufficient protein present to obtain the gel characteristics which are desired upon heating the mixture. Also, if the protein content is higher than approximately 15% by weight of the mixture, the protein would result in the gel becoming too tough or rubbery upon heating such that it could not be subsequently cooled and mechanically worked to obtain the desired consistency or texture for the final pudding product.

By utilizing ingredients wherein the protein content of the mixture is in the range of 3–15% by weight and wherein the other ingredients are those normally found in puddings, it has been found that a high protein pudding having the desirable consistency and texture may be produced. Some of these ingredients normally found in puddings which may be utilized in the present high protein pudding include sugar, non-fat dry milk, vegetable oil, starch (modified tapioca), alginate, salt and other flavoring materials. It should be understood that other materials may be utilized depending upon the operator's preference.

After the pudding mixture has been prepared in accordance with the operator's selection of ingredients the mixture is then subjected to a heating operation. This heating operation may consist of any well-known heating device and preferably would be either a steam infusor or a Jet Cooker which are commercially available. In either the steam infusor or the Jet Cooker, the pudding mixture is subjected to direct contact with pressurized steam so as to heat the mixture to a temperature of between 220° and 310° F. and preferably within the temperature range of 280°–300° F. During the heating of this mixture, a gel is formed to transform the aqueous slurry into a semi-solid state. It should be noted that by heating the mixture to a temperature above approximately 250° F. and holding the material for a predetermined period of time, the pudding may be aseptically produced.

After the material has been heated within the desired temperature range and the gel formation has occurred, the gel is transported to a standard commercially available swept surface heat exchanger. The gelled material within the heat exchanger is subjected to a cooling action by running cool water through the jackets of the heat exchanger and simultaneously subjected to mechanical working by the paddles or blades within the heat exchanger. This cooling action is carried out for a sufficient period of time to cool the gelled product to a temperature below 100° F. and preferably to approximately 70° to 85° F. In addition, the paddles or blades within the heat exchanger are rotated with a sufficient speed to break up the gel structure so as to obtain the desired consistency or texutre of the final pudding product. By altering the retention or cooling time that the gel is maintained in the heat exchanger as well as by altering the mechanical working to which the gel is subjected, it is possible to simply control the final texture or consistency of the pudding. Particularly, a hard texture pudding may be obtained by using a short cooling cycle and subjecting the mixture to slight mechanical working. Conversely, by retaining the gel for a long period of time for cooling purposes and by subjecting the gel to a more severe mechanical working, it is possible to produce a soft pudding texture or consistency.

Normally, this cooling step will be carried out for a period of between 1 and 4 minutes with the paddle unit within the heat exchanger running at approximately 100 r.p.m. As is readily apparent, by altering the jacket temperatures of the heat exchanger and by altering the r.p.m. of the paddle unit within the heat exchanger, it is possible to obtain any desired texture or consistency for the pudding.

After the material has been subjected to the cooling and mechanical working, the product is placed in cans and sealed which results in an aseptically produced product. The pudding is then ready for final distribution.

If the pudding is to be sold in a frozen condition such that it will subsequently be thawed for consumer use, it may be desirable to add a minor amount of starch-containing material such as modified tapioca starch. This minor amount of starch is utilized to give a freeze-thaw stability to the high protein product. If the pudding product is produced without starch and is subjected to a freeze-thaw cycle, the product has a tendency to form ice crystals and appear lumpy. However, by including the minor amount of starch, not to exceed approximately 2% by weight of the product, the water is apparently held by the starch such that ice crystals are not found within the product and a desirable appearing pudding product results even when subjected to a freeze-thaw cycle.

The following examples are illustrative of the invention and are not intended to limit the scope thereof.

EXAMPLE 1

A pudding mixture was prepared having the following ingredients:

| | Percent |
|---|---|
| Water | 66.0 |
| Sucrose | 14.0 |
| Non fat dry milk | 5.0 |
| Soy protein isolate | 10.0 |
| Vegetable oil | 4.0 |
| Salt | 0.5 |
| Alginate | 0.3 |
| Flavoring | 0.2 |
| | 100.0 |

This material was then passed through a Jet Cooker where the mixture was heated to a temperature between 290–295° F. The mixture exiting from the Jet Cooker was in a semi-solid state and had a gel structure. This gelled material was then passed through a swept surface heat exchanger where the material was cooled to a temperature of 75–80° F. while simultaneously being subjected to the mechanical working of the paddles in the heat exchanger. The gelled material remained in the heat exchanger for approximately three minutes. Thereafter the pudding material was placed in a can. The high protein pudding had a very pleasing texture and consistency which was substantially similar to starch pudding.

EXAMPLE 2

The procedures of Example #1 were substantially repeated except that the pudding mixture had the following ingredients:

| | Percent |
|---|---|
| Water | 67.0 |
| Sucrose | 12.0 |
| Non fat dry milk | 8.0 |
| Soy protein isolate | 3.0 |
| Vegetable oil | 9.0 |
| Salt | 0.5 |
| Alginate | 0.3 |
| Flavoring | 0.2 |
| | 100.0 |

EXAMPLE 3

The procedures of Example #1 were substantially repeated except that the pudding mixture had the following ingredients:

| | Percent |
|---|---|
| Water | 65.5 |
| Sucrose | 12.0 |
| Non fat dry milk | 3.0 |
| Soy protein isolate | 15.0 |
| Vegetable oil | 3.2 |
| Salt | 0.5 |
| Alginate | 0.3 |
| Flavoring | 0.5 |
| | 100.0 |

EXAMPLE 4

To Example #1, above, we added 2% modified tapioca starch to obtain a product with excellent freeze-thaw stability.

In view of the foregoing, it is readily apparent that a novel high protein pudding and method of preparing same has been described and that those skilled in the art may make certain changes or modifications in the product and process of producing same without departing from the spirit of the invention.

I claim:

1. The method of producing a high protein pudding comprising forming an aqueous mixture of pudding ingredients having a protein content in the range of approximately 3%–15% by weight, heating the mixture to form a gel and thereafter cooling the gel for a sufficient period of time to cool the gel to a temperature below 100° F. while subjecting it to mechanical working to form a pudding having a desirable texture and consistency.

2. The method according to claim 1 wherein the heating step consists of heating the mixture to a temperature in the range of 220°–310° F.

3. The method according to claim 2 wherein the temperature range is 280°–300° F.

4. The method according to claim 1 wherein the heating step consists of directly contacting the mixture with steam to heat the mixture to a temperature in the range of 220°–310° F.

5. The method according to claim 1 wherein the gel is cooled to a temperature of approximately 70° F. to 85° F.

6. The method according to claim 1 wherein the aqueous mixture of pudding ingredients has a water content of between 50%–78% by weight of the pudding mixture.

7. The method according to claim 6 wherein the mixture of pudding ingredients contains 10% by weight soy protein isolate.

8. The method according to claim 6 wherein the pudding mixture contains soy protein isolate in an amount sufficient to raise the protein content of said mixture to between 3% and 15% by weight.

9. The method according to claim 6 including the step of adding not more than 2% by weight starch to the pudding mixture to improve the freeze-thaw stability of the final pudding product.

10. The method according to claim 6 wherein the mixture of pudding ingredients contains protein containing material selected from the group of vegetable protein isolate, concentrate and curd in an amount sufficient to raise the protein content of said mixture to between 3% to 15% by weight.

11. The method according to claim 6 wherein the cooling and mechanical working of the gel is carried out for a period of time between 1 and 4 minutes.

12. The method of producing a high protein pudding comprising forming an aqueous mixture of pudding ingredients having soy protein isolate therein in the range of approximately 3%–15% by weight, heating the mixture by direct contact with steam to a temperature in the range of 220° F.–310° F. to form the mixture into a gel, cooling the gel for a sufficient period of time to cool the gel to a temperature below 100° F. and subjecting the gel to mechanical working for a period of time between 1 and 4 minutes to form a pudding having a desirable texture and consistency.

13. The method according to claim 12 wherein the aqueous mixture of pudding ingredients has a water content of between 50%–78% by weight of the pudding mixture.

14. The method according to claim 13 wherein the mixture of pudding ingredients contains 10% by weight soy protein isolate.

15. The method according to claim 13 including the step of adding not more than 2% by weight starch to the pudding mixture to improve the freeze-thaw stability of the final pudding product.

References Cited

UNITED STATES PATENTS

| | | | |
|---|---|---|---|
| 2,590,647 | 3/1952 | Pettibone | 99—139 X |
| 3,369,910 | 2/1968 | Ganz et al. | 99—139 |
| 2,084,640 | 6/1937 | Hall | 99—139 |

OTHER REFERENCES

Altschul, ed.: Processed Plant Protein Foodstuffs, Academic Press Inc., pub., New York, 1958, p. 410.

RAYMOND N. JONES, Primary Examiner

J. M. HUNTER, Assistant Examiner